(12) United States Patent
Sezgin

(10) Patent No.: US 10,759,353 B2
(45) Date of Patent: Sep. 1, 2020

(54) SEAT BACK MOBILE PHONE AND TABLET COMPUTER HOLDER

(71) Applicant: FKT KOLTUK SISTEMLERI URETIM VE DAGITIM SANAYI VE TICARET ANONIM SIRKETI, Bursa (TR)

(72) Inventor: Emin Sezgin, Bursa (TR)

(73) Assignee: FKT KOLTUK SISTEMLERI URETIM VE DAGITIM SANAYI VE TICARET ANONIM SIRKETI, Bursa (TR)

( * ) Notice: Subject to any disclaimer, the term of this patent is extended or adjusted under 35 U.S.C. 154(b) by 0 days.

(21) Appl. No.: 16/222,189

(22) Filed: Dec. 17, 2018

(65) Prior Publication Data

US 2020/0189485 A1 Jun. 18, 2020

(51) Int. Cl.
*B60R 11/02* (2006.01)
*H04B 1/3888* (2015.01)
*B60R 11/00* (2006.01)

(52) U.S. Cl.
CPC ...... *B60R 11/0241* (2013.01); *B60R 11/0252* (2013.01); *H04B 1/3888* (2013.01); *B60R 2011/0015* (2013.01); *B60R 2011/0071* (2013.01)

(58) Field of Classification Search
CPC ............ B60R 11/0241; B60R 11/0252; B60R 2011/0015; B60R 2011/0071
USPC ............ 297/188.04, 188.05, 188.06, 188.07; 248/301, 304; 211/103, 113
See application file for complete search history.

(56) References Cited

U.S. PATENT DOCUMENTS

| | | | | |
|---|---|---|---|---|
| 6,097,448 | A * | 8/2000 | Perkins | B60R 11/0229 224/275 |
| 6,216,927 | B1 * | 4/2001 | Meritt | B60R 11/02 297/188.06 X |
| 7,360,649 | B2 * | 4/2008 | Swaim | B60R 11/0211 297/188.06 X |
| 8,657,248 | B2 * | 2/2014 | Rowzee | A45C 11/00 206/37 |
| 9,527,420 | B2 * | 12/2016 | Dyle | B60N 2/58 |
| 9,815,555 | B2 * | 11/2017 | Riedel | B64D 11/0015 |
| 10,220,796 | B2 * | 3/2019 | Neumann | B64D 11/00152 |
| 2005/0001137 | A1 * | 1/2005 | Geros | B60R 11/0252 248/610 |
| 2005/0011920 | A1 * | 1/2005 | Feng | B60T 7/043 224/275 |
| 2010/0294818 | A1 * | 11/2010 | LaFargue | B60R 11/0241 224/400 |
| 2011/0278885 | A1 * | 11/2011 | Procter | B60R 11/0235 297/188.04 X |
| 2015/0123433 | A1 * | 5/2015 | Lamb, Jr. | B60R 11/0229 297/188.04 X |

(Continued)

*Primary Examiner* — Rodney B White
(74) *Attorney, Agent, or Firm* — Duane Morris LLP; Gregory M. Lefkowitz

(57) ABSTRACT

A mobile telephone and tablet computer holder (100) which has been developed to provide passenger comfort during traveling by commercial vehicles used in the passenger transportation. The mobile phone and tablet computer holder (100) includes an upper holder (120) and a lower holder (130) between which the mobile phone or tablet is positioned, and the bandage (110) for connecting the upper holder (120) and the lower holder (130) to the seat backrest (200).

7 Claims, 1 Drawing Sheet

(56) References Cited

U.S. PATENT DOCUMENTS

| | | | | |
|---|---|---|---|---|
| 2015/0175081 A1* | 6/2015 | Rodriguez | ................ | A45F 3/02 |
| | | | | 224/600 |
| 2015/0175265 A1* | 6/2015 | Thiele | .............. | B64D 11/00152 |
| | | | | 297/188.04 |
| 2015/0367787 A1* | 12/2015 | Dueser | ................ | B60R 11/0235 |
| | | | | 297/188.05 |
| 2016/0249073 A1* | 8/2016 | Margis | ............... | H04N 21/2146 |
| 2016/0257404 A1* | 9/2016 | Ferris | ..................... | F16M 11/10 |
| 2016/0362067 A1* | 12/2016 | Jodon De Villeroche | ................... | |
| | | | | B60R 11/0258 |
| 2017/0313260 A1* | 11/2017 | Minn | .................. | B60R 11/0235 |
| 2018/0111567 A1* | 4/2018 | Frazier | ................... | B60R 11/02 |

\* cited by examiner

SEAT BACK MOBILE PHONE AND TABLET COMPUTER HOLDER

TECHNICAL FIELD

The invention relates to a mobile telephone and tablet computer holder which has been developed to provide passenger comfort during traveling by commercial vehicles used in passenger transportation.

In particular, the invention relates to a mobile telephone and tablet computer holder consisting of an elastic product and parts made of rubber which is mounted on the back of vehicle seats in commercial vehicles used in intercity passenger transportation.

THE STATE OF THE ART

Nowadays, it is important to provide comfort for the passenger during the journey in commercial vehicles used particularly for intercity passenger transportation such as buses and minibuses. In particular, the commercial vehicles used in intercity journeys where the traveling time is long are designed based on the passenger comfort. With the developing technology for this purpose, new functions have been brought to the seats by adding screen, opening and closing trays or tablets, storage pockets, hangers and similar structures to the passenger seats.

Mobile phones and tablet computers have become an indispensable part of life with the developing technology and the change human habits. People intensely use these devices particularly during the traveling. With the changing of habits and passenger demands, special structures have been started to be designed for the positioning of mobile phones and tablet computers in the vehicles used in passenger transportation. For this purpose, special housings are formed usually on the back of the seats and on the folding trays allowing the passenger to eat comfortably during the journey. However, in the case of reclining the seat to which these trays attached, they cannot maintain their positions, causing the device on the tray to drop or not to be held with the right angle. Nowadays, another method used for the positioning of mobile phones and tablets is the pockets attached to the seat back. However, in the event of the vehicle's shaking, these pockets cannot stably hold the mobile phones and tablet computers that are positioned and the device may fall down.

In the vehicles used in passenger transportation, many studies have been carried out and new products have been developed in order to position the mobile phones and tablet computers safely and easily. One of these studies is the subject of the useful model No TR201702063 and the titled "Seat Tablet". The invention relates to a seat tablet, allowing passengers to place their belongings, comprising a cargo net to protect and keep the items placed, being located behind the seats of public transport used in passenger transportation such as bus, minibus, train, plane, ship, etc. and having a foldable feature carrying the various offers and/or mobile phones, tablet computers and etc. with a suitable angle for using.

Another study is the invention subject to the useful model No TR201402578 and titled "Passenger seat service tablet with a channel to put the tablet computer". This invention relates to the passenger seat tablet developed in order to use in the passenger seats allowing passengers to travel by sitting in the transportation vehicles such as bus, minibus, train, ship, plane etc. and to put their belongings and tablet computers, preventing fracture by folding reverse in overloading.

Another study is the invention subject to the useful model No TR201201429 and "Passenger seat storage compartment". This invention is a functional embodiment, consisting of retainer barrier allowing the items in the compartment to be kept inside by being pulled in front of said storage compartment with the storage compartment which is a hollowed form created by unloading towards to the backrest in the portion called as a backrest housing behind the passenger seats used in the transportation sector and allowing passengers to keep their mobile phones, cameras, mp3 players and such technological devices or small sized personal belongings during the traveling.

Thus, it is obligatory to have a mobile phone and tablet computer holder which eliminates the existing disadvantages in the prior art and to make an improvement in the technical field related to the insufficient existing solutions.

BRIEF DESCRIPTION OF THE INVENTION

The present invention relates to a mobile phone and tablet computer holder which meets the aforementioned requirements, developed for the purpose of providing comfort to the passenger during the journey in the commercial vehicles used in the passenger transportation eliminating all disadvantages and providing additional advantages.

Based on the state of art, it is an object of the present invention to provide mobile phones and tablet computers with one apparatus by means of developed mobile phone and tablet computer holder to be fixedly positioned in the backrest of the seat.

The object of the invention is to provide mobile phones and tablet computers of each brand and in different sizes with no need for an adjustment or additional part by means of the flexible strap and the holder structure of the mobile phone and tablet computer holder.

Another object of the invention is, in the event of an accident, to dampen the opposite load and to minimize the damage to the head area of the passenger by means of said upper holder is made of rubber material.

Another object of the invention is to save space by fixing the mobile phone and tablet computer holder to the backrest without the need for extra apparatus of the mobile phone and tablet computer holder.

Another object of the invention is to ensure that the upper holder and the lower holder in the mobile phone and tablet computer holder are connected to the backrest by means of two independent straps such that the device to be positioned is firmly held in place even if the screen size of the device is large or small.

Another object of the invention is to ensure that the mobile phone or tablet computer to be kept at the eye level in the position where the passenger is sitting by means of the positioning of the mobile phone and tablet computer holder behind the headrest of the seat.

The structural and characteristic features and all advantages of the invention will more clearly become apparent with the drawings and the detailed description by making references to these drawings given below, therefore, the evaluation must be performed by taking these drawings and detailed descriptions into consideration.

BRIEF DESCRIPTION OF THE DRAWINGS

For better understanding of the advantages of the present invention connected with the embodiment of the present invention and additional elements, it must be evaluated together with the figures described below.

REFERENCE NUMBERS

Figure 1:
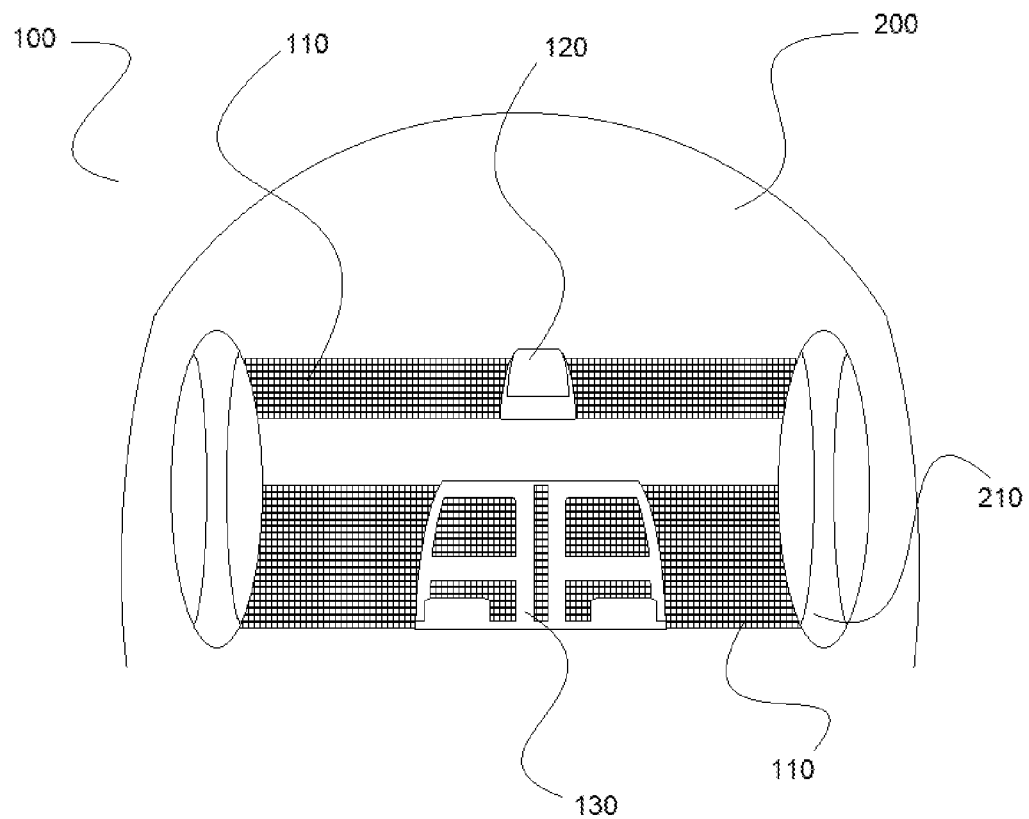
FIG. 1; is a front schematic general view of the mobile phone and tablet computer holder, FIG. 2; is a side schematic general view of the upper holder, FIG. 3; is a side schematic general view of the lower holder.

100. Mobile phone and tablet computer holder
110. Strap
120. Upper holder
121. Upper housing
122. Upper support tongue
123. Upper strap housing
130. Lower holder
131. Lower housing
132. Lower support tongue
133. Lower strap housing
200. Seat backrest
210. Handle

DETAILED DESCRIPTION OF THE INVENTION

In this detailed description, the mobile telephone and tablet computer holder (100) which has been developed in order to provide the comfort of the passenger during the journey in commercial vehicles used in the passenger transportation according to the invention, is described only as an example for a better understanding of the subject and without any limiting effect.

The mobile phone and tablet computer holder (100) shown in FIG. 1 comprises the upper holder (120) and the lower holder (130) which is positioned between the mobile phone or the tablet computer, and the strap (110) allowing this upper holder (120) and lower holder (130) to be connected behind the seat backrest (200). Said strap (110) is in elastic shape, allowing these parts to be mounted on the seat backrest (200) by passing through the upper holder (120) and the lower holder (130). By means of the elastic structure of said strap (110), mobile phones and tablets of different sizes can be easily placed in the mobile phone and tablet computer holder (100) without a need for an extra apparatus or adjustment. Since said strap (110) is designed as two separate parts passing from the upper holder (120) and the lower holder (130), it has been particularly provided that the devices having large screen are securely placed in the mobile phone and tablet computer holder (100). While the devices having larger screen size are placed in the mobile phone and tablet computer holder (100), said strap (110) moves the lower holder (130) and upper holder (120) away from each other and provides the opening required for positioning the device. Said mobile phone and tablet computer holder (100) is preferably connected between the mobile phone and tablet computer holder (100) and the handles (210) in the seat backrest (200). Thus, the mobile phone or tablet computer placed in the mobile phone and tablet computer holder (100) is kept at the eye level of the passenger.

Figure 2:
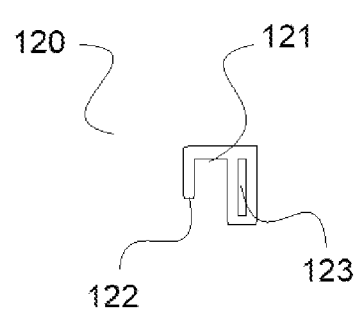

The upper holder (120) shown in FIG. 2 is made of rubber material and provides to keep the mobile phone or tablet computer from the upper part. By means of said upper holder (120) is made of rubber material, it has been provided that in the event of an accident, the opposite load is dampened and the damage to the head area of the passenger is minimized. Said upper holder (120) comprises the upper housing (121) in which the mobile phones or tablet computers are placed, the upper support tongue (122) keeping the device in place acting as a support to prevent the mobile phone or tablet computer placed in this upper housing (121) from displacing due to the shaking or gravity and the upper strap housing (123) through which the strap (110) allowing the upper holder (120) to be fixed behind the seat back (200) passes.

Figure 3:
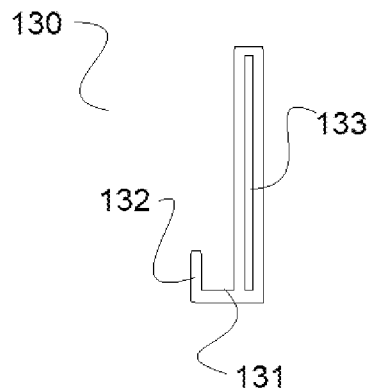

The lower holder (130) shown in FIG. 3 is made of rubber material and provides to keep the mobile phone or tablet computer from the lower part. By means of said lower holder (130) is made of rubber material, it has been provided that in the event of an accident, the opposite load is dampened and the damage to the head area of the passenger is minimized. Said lower holder (130) comprises the lower housing (131) preferably larger than the upper holder (120) in which the mobile phones or tablet computers are placed, two lower support tongue (132) keeping the device in place acting as a support to prevent the mobile phone or tablet computer placed in this lower housing (131) from displacing due to the shaking or gravity and the lower strap housing (133) through which the strap (110) allowing the lower holder (130) to be fixed behind the seat back (200) passes.

Said mobile phone and tablet computer holder (100) has been developed in order to provide a secure positioning of the passengers own mobile phone or tablet during the journey in the commercial vehicles used for the intercity passenger transportation. By means of the upper support tongue (122) and the lower support tongue (132) provided by said mobile phone and tablet computer holder (100), the mobile phone or tablet computer is still held even if the seat is reclined. While using the mobile phone and tablet computer holder (100) positioned between the handles (210) on the backrest (200), the passenger first places the mobile phone or tablet computer in the lower housing (131) in the lower holder (130). Then, it allows the device to be fitted into the upper housing (121) by pushing the upper part of the mobile phone or tablet computer back. At this stage, the strap (110) allows the body of the device to be placed in the upper housing (121) without damage by allowing the upper holder (120) to be lifted upwards. After the mobile phone or tablet computer is placed between the upper holder (120) and the lower holder (130), the strap (110) is then allowed to be fitted in the device body of the upper housing (121) and lower housing (131) by lifting back.

The invention claimed is:

1. A mobile phone and tablet computer holder (100) allowing a passenger to securely position a mobile phone or tablet computer on a seat backrest (200) of a passenger transportation vehicle, said mobile phone and table computer holder comprising an upper holder (120) and a lower holder (130) adapted to hold an upper and lower edge, respectively, of a mobile phone or tablet held by the mobile phone and tablet computer holder (100), and an upper strap (110) for connecting the upper holder (120) to the seat backrest and a lower strap for connecting the lower holder (130) to the seat backrest (200), wherein the upper holder (120) comprises an upper strap housing (123) and the upper strap housing (123) is slidably coupled to the upper strap;

wherein the lower holder (130) comprises a lower strap housing (133) and the lower strap housing (123) is slidably coupled to the lower strap; and wherein the upper holder (120) and the lower holder (130) are independently slidable on the upper strap and lower strap, respectively.

2. The mobile phone and tablet computer holder (100) according to claim 1, wherein said upper strap and lower strap (110) are elastic.

3. The mobile phone and tablet computer holder (100) according to claim 1, wherein the upper holder (120) comprises an upper housing (121) in which the mobile phone or tablet computer is placed.

4. The mobile phone and tablet computer holder (100) according to claim 3, wherein an upper support tongue (122) secures the mobile phone or tablet computer placed in said upper housing (121).

5. The mobile phone and tablet computer holder (100) according to claim 1, wherein the lower holder (130) comprises a lower housing (131) in which the mobile phone or tablet computer is placed.

6. The mobile phone and tablet computer holder (100) according to claim 5, wherein a lower support tongue (132) secures the mobile phone or tablet computer placed in said lower housing (131).

7. The mobile phone and tablet computer holder (100) according to claim 1, wherein the upper holder (120) and the lower holder (130) are made of a rubber material.

* * * * *